United States Patent
Bellifemine et al.

(10) Patent No.: US 7,966,160 B2
(45) Date of Patent: Jun. 21, 2011

(54) METHOD AND SYSTEM FOR USER MODELLING

(75) Inventors: Fabio Bellifemine, Torino (IT); Angelo Difino, Torino (IT); Barbara Negro, Telecom (IT); Liliana Ardissono, Torino (IT)

(73) Assignee: Telecom Italia S.p.A., Milan (IT)

( * ) Notice: Subject to any disclaimer, the term of this patent is extended or adjusted under 35 U.S.C. 154(b) by 926 days.

(21) Appl. No.: 10/582,250

(22) PCT Filed: Dec. 12, 2003

(86) PCT No.: PCT/EP03/14116
§ 371 (c)(1), (2), (4) Date: Jun. 9, 2006

(87) PCT Pub. No.: WO2005/059782
PCT Pub. Date: Jun. 30, 2005

(65) Prior Publication Data
US 2007/0118639 A1  May 24, 2007

(51) Int. Cl.
*G06F 17/10* (2006.01)
(52) U.S. Cl. .......................................................... 703/2
(58) Field of Classification Search ...... 703/2; 709/224; 713/165
See application file for complete search history.

(56) References Cited

U.S. PATENT DOCUMENTS

| | | | |
|---|---|---|---|
| 6,519,571 B1 * | 2/2003 | Guheen et al. | 705/14 |
| 7,630,986 B1 * | 12/2009 | Herz et al. | 707/10 |
| 2002/0013827 A1 | 1/2002 | Edstrom et al. | |
| 2002/0199004 A1 | 12/2002 | Jaye | |
| 2005/0060542 A1 * | 3/2005 | Risan et al. | 713/165 |
| 2006/0265402 A1 * | 11/2006 | Edmond et al. | 707/10 |
| 2007/0214207 A1 * | 9/2007 | Xie et al. | 709/201 |
| 2009/0013347 A1 * | 1/2009 | Ahanger et al. | 725/36 |

FOREIGN PATENT DOCUMENTS

DE   199 22 185 A1   11/2000

(Continued)

OTHER PUBLICATIONS

Machado, I. et al., "One for All and All in One: A Learner Modelling Server in a Multi-Agent Platform," User Modelling Proceedings of the Seventh International Conference UM'99, 11 sheets, (1999).

(Continued)

*Primary Examiner* — Jason Proctor
*Assistant Examiner* — Andre Pierre Louis
(74) *Attorney, Agent, or Firm* — Finnegan, Henderson, Farabow, Garrett & Dunner, L.L.P.

(57) ABSTRACT

An improved user modeling server for use in media delivery networks, wherein a plurality of applications exchange usage data via at least one user modeling server. The user modeling server has an associated function for regulating exchange of usage data between any of a first application and a second application in the set, wherein the function defines: whether the usage data are provided by the first application to the second application, and a degree of trust acknowledged by the second application to the provided usage data. The function is in the form of a bi-directional relationship, wherein any of the first and second applications is configured for accepting, refusing or negotiating the relationship. The function is preferably configured for valuating the usage data, and defining debit and credit values each application has in respect to usage data exchanged with other applications in the set.

21 Claims, 5 Drawing Sheets

FOREIGN PATENT DOCUMENTS

Figure 1:
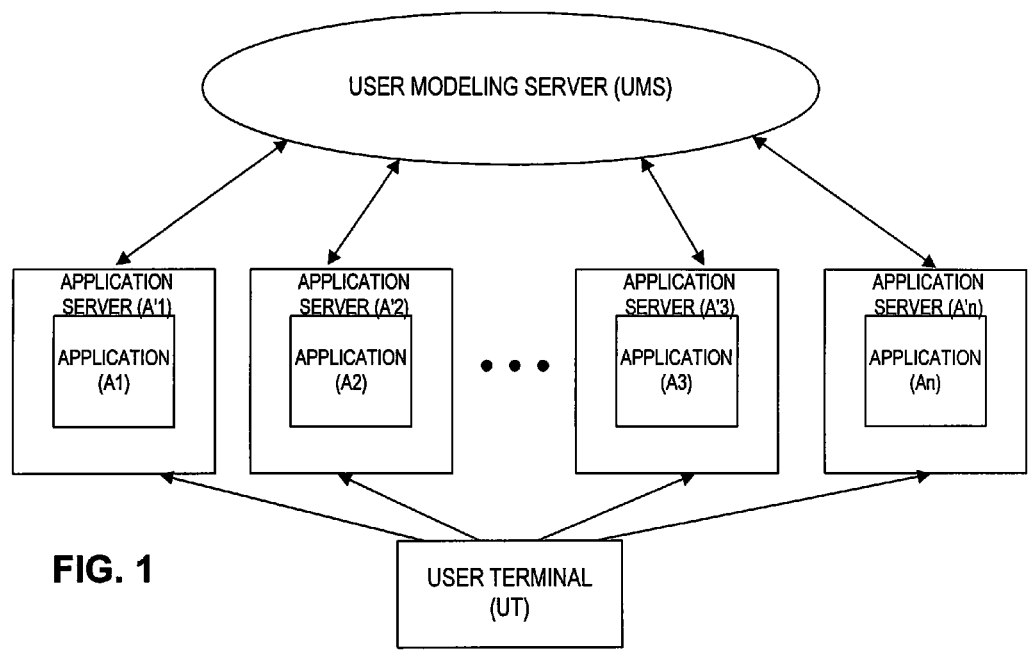

| WO | WO 99/60503 | 11/1999 |
|---|---|---|
| WO | WO 01/86494 A1 | 11/2001 |
| WO | WO 03/009191 A2 | 1/2003 |

OTHER PUBLICATIONS

Kay, J. et al., "Personis: A Server for User Models," Proceeding of AH 2002, Lecture Notes in Computer Science 2347, pp. 203-212, (2002).

Kobsa, A. et al., "Privacy Through Pseudonymity in User-Adaptive Systems," ACM Transactions on Internet Technology, vol. 3, No. 2, pp. 149-183, (May 2003).

Kagal, L. et al., "A Policy Language for a Pervasive Computing Environment," IEEE 4th International Workshop on Policies for Distributed Systems and Networks, 12 sheets, (2003).

* cited by examiner

METHOD AND SYSTEM FOR USER MODELLING

CROSS REFERENCE TO RELATED APPLICATION

This application is a national phase application based on PCT/EP2003/014116, filed Dec. 12, 2003, the content of which is incorporated herein by reference.

FIELD OF THE INVENTION

The present invention pertains to user modeling and personalization in media delivery networks such as the Internet and was developed by paying specific attention to improving operation of user modeling servers included in these networks.

DESCRIPTION OF THE RELATED ART

The provision of personalized services in media delivery networks is generally based on the utilization of user modeling systems that collect information about users' preferences, skills, habits, needs or any other information that might contribute to realize a detailed picture of the individual users accessing the service. For instance, in e-commerce applications, the personalized recommendation of items enables services to suggest the most convenient solution for the customer, by considering his/her needs, constraints and interests. The recommendation of items can be coupled with a personalized presentation of information about products and services in order to provide customized presentations and enhance the quality of electronic catalogues, as well as their accessibility to users with special needs.

User modeling often employs explicit modeling where users are questioned on their preferences before (and also while) interacting with the system. Alternatively, implicit modeling can be used to obtain user preferences through observation of user activities as they interact with the system. The capability of modeling a user enables an application to automatically adapt—i.e. personalize—their information and services to different user needs, preferences or habits.

Although various personalized services employ different preference acquisition and item recommendation techniques (e.g., content-based vs. collaborative filtering), they usually embed a specific user modeling module. The user modeling module is responsible for managing the acquisition of user information and for modeling either clusters of users or individual users. The user modeling module is employed as an inference engine within the application offering the personalized service.

The open environment characterizing interaction over geographical webs such as the Internet have facilitated the development of User Modeling Servers, hereafter referred also to as UMSs, offering user modeling facilities to more than one application. In this scenario, different applications rely on the same UMS, making possible the reusing of user model information across applications.

In other words, a user modeling server (UMS) is a centralized system to which applications (as provided by content providers, services, web-sites, e-commerce actors, etc.) can delegate the user modeling function.

In a simplified schematization of that function, applications provide data (generally in the form of usage data) to a UMS and request an estimation of e.g. user preferences, needs, and habits. Using a UMS common to more than one application may reduce the complexity of an application because the user modeling function is used rather than implemented within the application. Employing a UMS common to more than one application may be desirable as it enables the construction of more complete user models, including cross-application and cross-domain modeling (i.e. the user preference for a given domain/application can influence the user preferences for other domains/applications).

User Modeling Servers supporting the collection of information about the user and providing inferential capabilities for the estimation of the user's skills and preferences have been developed in the tutoring area e.g. by means of a learner modeling server providing multiple (software) teaching agents with information about the user's knowledge. In this scenario, the applications generally cooperate with one another to the creation of a rich student model to be utilized for the personalization of the lectures and courses.

In "*One for All an All for One: A learner modeling server in multi-agent platform*" by Machado I et al., published in User Modelling Proceedings of the Seventh International Conference UM'99, p. 211, a learner modeling server that can be used by several applications (composed by several agents) is described. The server keeps one single database for all the learners being modeled by all agents, allowing different applications to access the same learner model simultaneously.

In "*Personis: A Server for User Models*" by Kay, J. et al., published in Proceedings of AH 2002, Lecture Notes in Computer Science 2347, pp. 203-212, a user model server is described that can support reuse of the user models over a series of adaptive hypertext systems. The Personis server allows the user to define which applications are allowed to see each part of the user model. The user can also control the information sources that should be made available to each application. An element of the Personis UMS is the "resolver" (a software module) that is used to interpret the evidence available to it. Specialized resolvers can be associated with an application; one client adaptive hypertext system might use one resolver.

Applicants have noted that this prior art arrangement is based on an essentially static model, wherein an application selects in a fixed, non-configurable way those applications that will have to be taken into account by its own resolver. Consequently, such an arrangement is not suitable in scenarios where the commercial actors providing applications are different and often in competition.

US patent application No. 2002/0199004 discloses a method and a computer apparatus for establishing a global interest profile of a user. The global user profile can be compiled anonymously from local user profiles generated by the local servers. Items of information, such as click stream data, collected in respect of a plurality of users having visited a plurality of web pages, can be processed in a common enterprise server in order to calculate an interest score for given interest categories (subjects, topics, concrete or abstract concepts).

US 2002/0013827 discloses a personal service environment manager host that manages functionality shared among applications. A common user profile directory provides a single point of access to user-related data in the network. User-related data are accessible through standard interfaces, which are administered by operators, applications and end-users via the personal service environment manager.

Additionally, WO 01/0086494 discloses so-called user-specific software agents that store user profile data. Each user is provided with a profile agent in a multi-service context. A service application can access user data only by means of a contract associating a certain information concerning the user with certain services. The privacy of the user is said to have a central position in the system, since the user profile is centralized with an agent that can be controlled by the user.

OBJECT AND SUMMARY OF THE INVENTION

Applicants have observed that unconditional sharing of the usage data among different applications may not be accepted for an application. This is particularly true in open and business environments that usually require a third-party to provide UMS service to applications owned by different actors, possibly in mutual competition.

Applicants have realized that usage data and any other type of feedback provided by an application about its users and their behaviors and exchanged with other applications have a high practical value: a key player, as the owner of an application, might be reluctant to make generally available the database of its usage data.

In a network populated by a plurality of applications that use the same UMS, each application $A_i$ needs to clearly define and identify those applications to which it wants to provide the information or sub-sets of information it collected about users' behavior.

The application $A_i$, can define policies and values of reliability of the usage data of other applications. For example, $A_i$ might decide not to trust the usage data and users' preferences coming from a small, unknown, and young application firm or refuse information from application $A_j$ because of a bad past experience.

According to the present invention, that object is achieved by means of a method having the features set forth in the claims that follow. The invention also relates to a corresponding system and encompasses a media delivery network comprising such a system, as well as a computer program product loadable in the memory of at least one computer and comprising software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one" computer is obviously intended to highlight the possibility for the arrangement of the invention to be implemented in a decentralized fashion.

In one of its aspects, the present invention provides user modeling in media delivery networks, wherein a set of applications are adapted to exchange usage data by means of at least one user modeling server: associated with the user modeling server is a function for regulating exchange of usage data between any of a first application and a second application in said set, wherein the function defines:
 whether said usage data are provided by said first application to said second application, and
 a degree of trust acknowledged by said second application to the provided usage data.

By trust or "degree of trust", within the context of the present invention, it is meant a degree, which can be expressed for example as a percentage value, of usage by an application of data provided by a different application. In other words, the degree of trust represents the extent to which an application decides to use the usage data available from another application.

Preferably, the function for regulating the exchange of usage data is in the form of a bi-directional relationship, wherein any of the first and second applications is configured for accepting, refusing or negotiating the relationship. In a preferred embodiment, the bi-directional relationships between first and second applications are included in a user modeling component that calculates the prediction about preferences of a user by taking into account the function of regulating the exchange of data.

In the arrangement described herein applications can define sharing policies and values of reliability, i.e., the degree of trust, of the usage data of other applications. In other words, a given application can clearly identify and define sharing rules for sharing information it owns, or a subset of it, and trust relationships for attributing a degree of confidence to the data the application receives.

Sharing policies determine which applications will benefit from the usage data and feedback of a given application, and under what conditions those applications will have access to these data.

Dynamic definition and management of trust relationships are allowed together with persistent policies to identify applications either in an extensive way, i.e. by listing all applications, or in an intensive way, i.e. by defining automatically one or more properties that must be satisfied by all trusted applications, e.g. be older than 2 years or have more than 1 million users.

According to a preferred embodiment, the present invention relates to an enhanced UMS wherein the registration of an application with the UMS comprises the definition of bi-directional trust relationships among applications in order to define:
 permissions (and, more generally, policies) for the utilization of usage data by other applications;
 a set of relationships to identify the degree of trust and/or importance of usage data provided by other applications, and how to use them for estimating user preferences.

In a preferred embodiment, these rules are bi-directional in nature, meaning that they have to be accepted and satisfied both by the application providing usage data and by the application utilizing usage data.

In one of its preferred embodiments, the method of providing user modeling according to the present invention comprises the possibility of defining a sort of policy for managing the exchange of values that takes into account "debits" and "credits". A debit is the 'value' each application $A_i$ has received by other applications under the form of usage data contributing to the improvement of the user model estimation provided by the UMS to $A_i$. A credit is the 'value' provided by $A_i$ to other applications.

The arrangement described herein thus provides a system where a provider wishing to use the user modeling service from the UMS for personalizing its own application, can enter in the UMS network in a controlled way. The provider has thus the possibility of listing those actors to which it provides the usage data and feedback generated by its own application and those actors from which information is acquired (and to which extent the information is acquired). This solution allows protection, in a competitive market, of the value of the feedback information and to differentiate a large application providers from a small application provider having shorter, less frequent sessions, with fewer users, and, consequently, with a small set of usage data. Therefore, the arrangement described herein allows different actors to share the same UMS while maintaining classic competition rules.

BRIEF DESCRIPTION OF THE ANNEXED DRAWINGS

Figure 3:
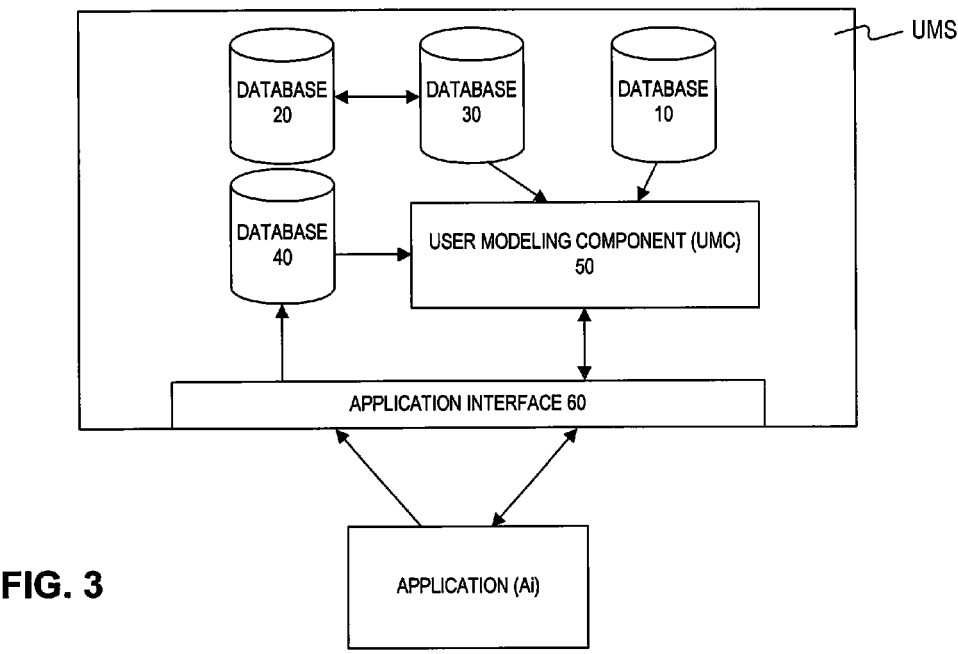
Figure 2:
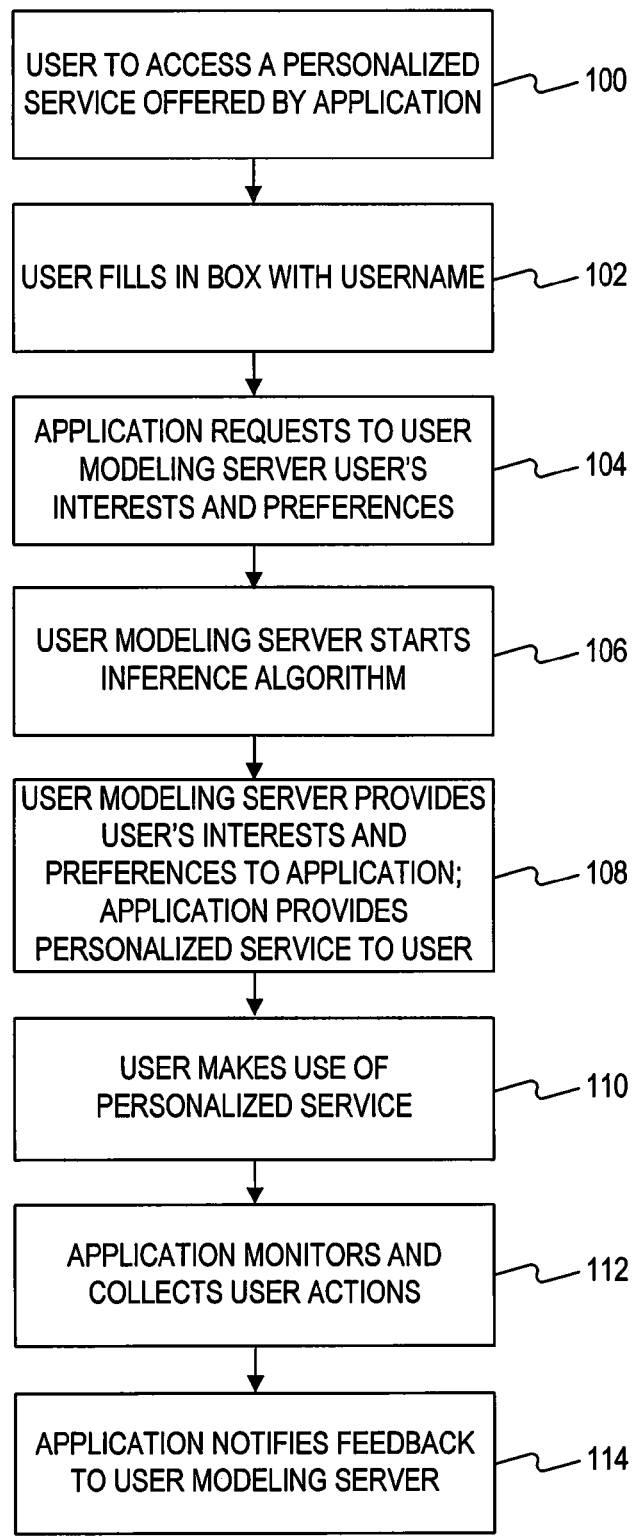
Figure 4A:
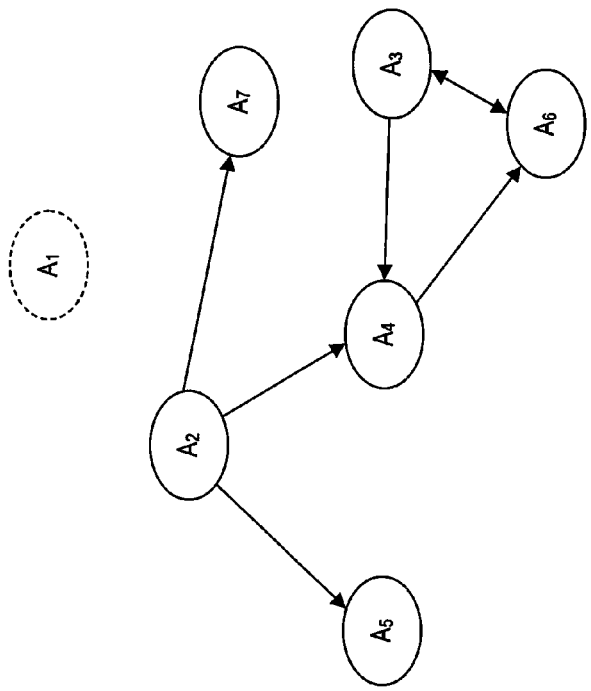
Figure 4D:
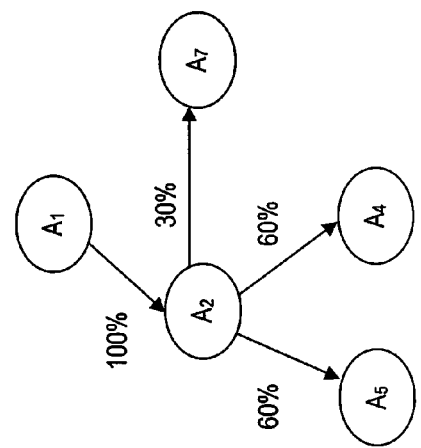
Figure 4C:
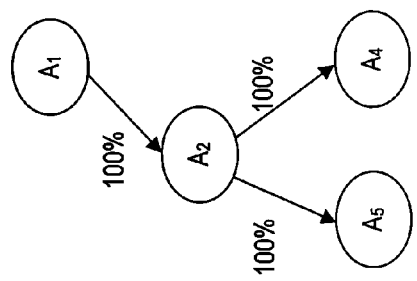
Figure 4B:
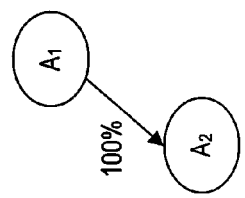
Figure 5:
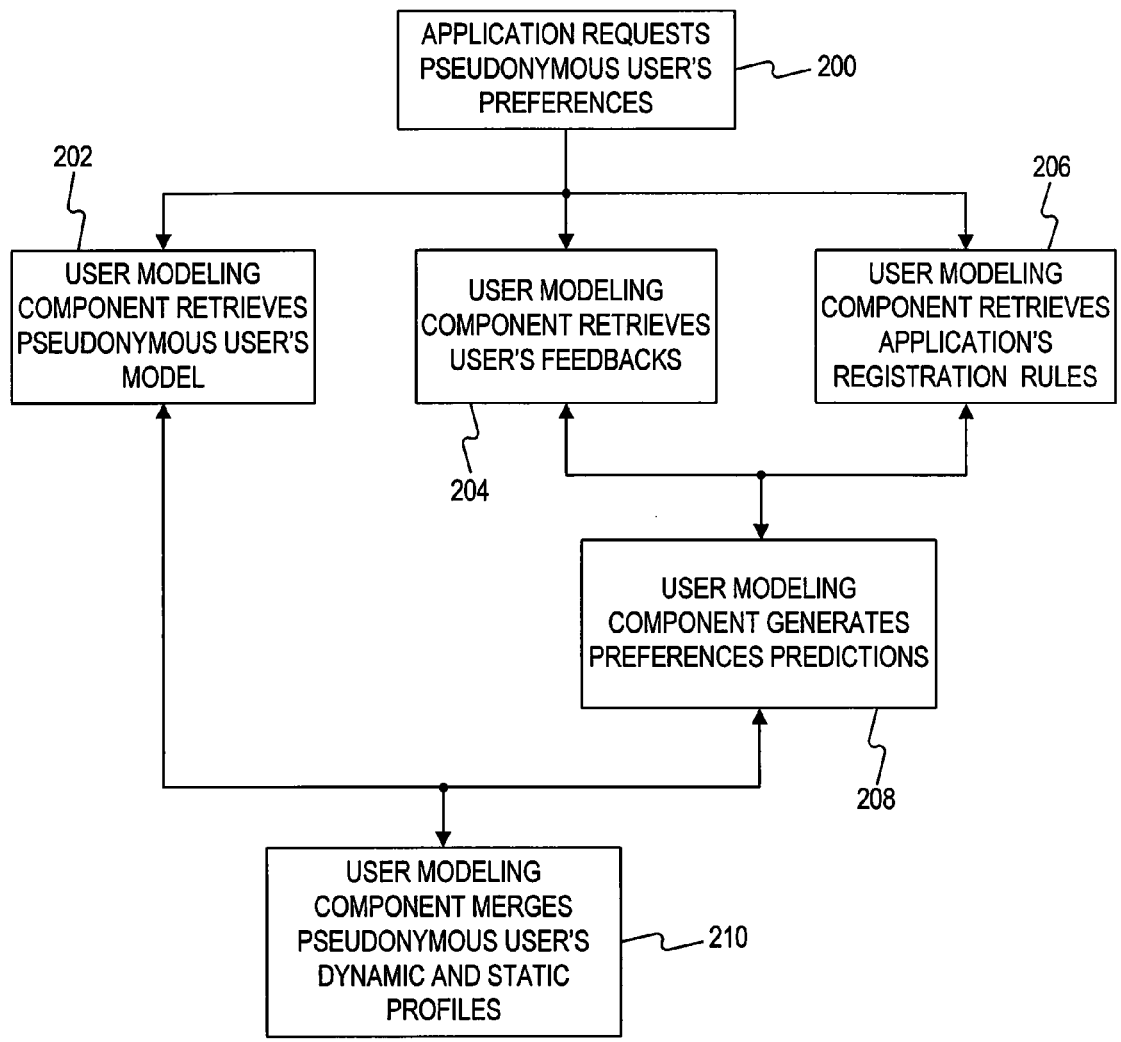
Figure 6:
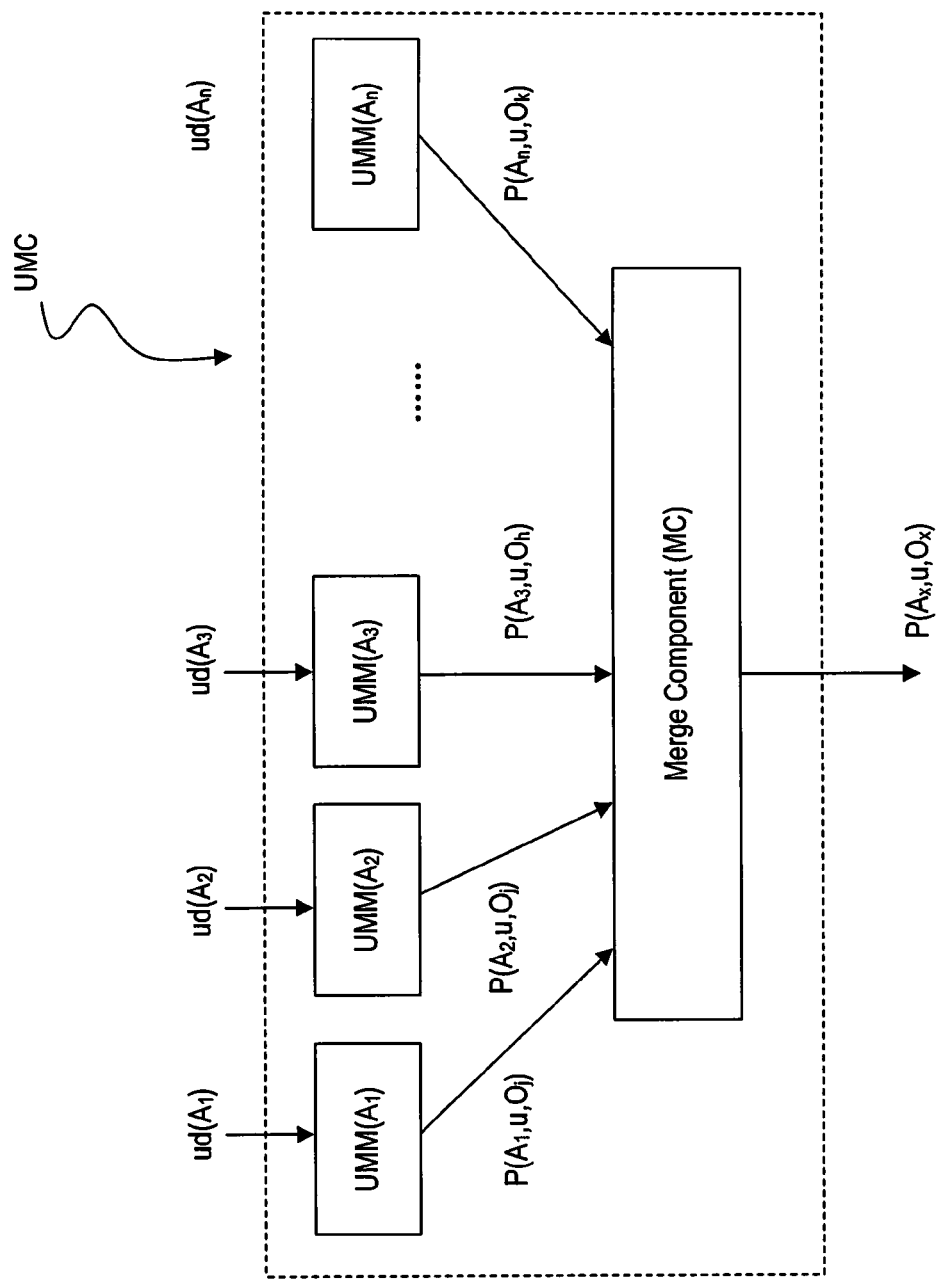

The invention will now be described, by way of example only, with reference to the annexed figures of drawing, wherein:

FIG. 1 shows the basic components of a user modeling server (UMS) arrangement as described herein, FIG. 2 is a flow chart exemplary of possible operation of the arrangement of FIG. 1, FIG. 3 is a block diagram showing the internal architecture of a UMS arrangement according to an embodiment of the present invention, FIG. 4, comprising four portions designated a to d, respectively, shows different trust relationships according to an embodiment of the invention, FIG. 5 is exemplary of how user preferences may be determined in the arrangement described herein, and FIG. 6 shows the components of a user modeling component (UMC) comprised in a UMS according to an embodiment of the invention.

DETAILED DESCRIPTION OF PREFERRED EMBODIMENTS OF THE INVENTION

An exemplary embodiment of the arrangement described herein will now be detailed by referring to an improved user modeling server (UMS).

In several application domains, user-adaptive systems have already proved to be more effective and/or usable than non-adaptive systems. Utilizing personalization and the underlying one-to-one paradigm is of paramount importance for application entities in order to be successful in today's short-lived, complex and competitive markets.

In order to exhibit a personalized behavior, software systems rely on models of relevant user characteristics (e.g., interests, preferences, knowledge) and the acquisition and the management of these models is allotted to a dedicated user modeling component.

A distinctive aspect of the user model server (UMS) described herein is dictated by the concern for the value of the pieces of information that an application notifies to the central user modeling server.

User-adaptive or personalized applications generally aim at anticipating the needs of each individual user, while adapting to these needs by interacting with the user. In order to be able to individually adapt to the current user, user-adaptive applications rely on information about individual characteristics of each user and characteristics of the user groups to which a user belongs.

This information (or usage data) is stored in so-called user profiles. Typical information about users includes:

user data: demographic data, user knowledge, skills, capabilities, interests, preferences, goals and plans feedback data: observable usage (e.g., selective actions and ratings) and usage regularities (e.g., usage frequency and action sequences); and environment data: software and hardware environment and the user's current location, for example.

This information is individually acquired for, and associated with, each user. The user profile persists across different user sessions and a user is linked to his or her user model at the beginning of each session.

While user data usually represent static information provided by the user for example filling in a registration form, feedback data are a sequence of observable/observed pieces of information, where the observations can be made by the user-adaptive application.

The present description will refer to information collected by a user-adaptive application also as "feedback", which comprises thus a reaction from the user to the proposed solution (i.e., the feedback data) and optionally also the user data.

Conversely, a user model is a process that, starting from the whole or part of the information (the user profile), will generate context-based predictions on user interests and/or preferences.

FIG. 1 shows the generic architecture that allows a UMS as described herein to support reuse of user models over a series of adaptive systems.

From a static point of view, the global system is comprised of:

a UMS, which is a server providing the user modeling functionality, and a set of applications $A_1, \ldots, A_n$: these are generally user-adaptive or personalized applications such as services, content providers, e-commerce sites, which take advantage from the UMS.

In a preferred embodiment, the system will include at least one server UMS providing the user modeling service and a plurality of application servers $A_1', \ldots, A_n'$ where the applications $A_1, \ldots, A_n$ or part of them can run. These application servers are connected through a network to a user terminal UT that sends the required information.

The arrows in FIG. 1 indicate the data flows between the different actors in the global scenario. A generic user will request a personalized service from the application, and the application will request a specific user model from the server UMS. After user interaction with the service, the application will notify to the server UMS the usage data.

The sequence of operations and steps performed by the different components in the system according to an embodiment of the invention is shown in FIG. 2.

It will be assumed that a user U wants to access a personalized service offered by an application $A_i$ in the domain $O_i$ (step 100). For instance, a user John Doe requests a list of suggestions from a large "Librarian" site ($A_i$) in the literature-and-book domain ($O_i$).

In a step 102 the user fills in an appropriate box with his username u.

This may occur in compliance with requirements for secrecy in user-adaptive systems in order to guarantee the anonymity of both users and user modeling servers. For instance, pseudonymous identification (see, e.g. A. Kobsa et al.: "*Privacy Through Pseudonimity in User Adaptive Systems*". ACM Transactions on Internet Technology, Vol. 3, No. 2, May 2003, pages 149-183) may be resorted to: the user initially chooses a unique but otherwise uncontrolled pseudonym u which he will also employ in subsequent sessions.

Pseudonimity may represent a sensible compromise between privacy demands and the requirements of the user modeling: the arrangement disclosed herein can thus be adapted to operate in full compliance with existing laws and regulations in the area of protection of privacy.

In order to build the appropriate personalized page, in a step 104 the application $A_i$ requests to the core component UMS the interests and preferences of the user with pseudonym (username) u. Because of this request, in a step 106, the server UMS starts an inference algorithm that will be detailed in the following. In other words, UMS implements an inference process in order to build the user model associated to the given pseudonym and, specifically, it calculates the preferences of the user indicated as u in the domain $O_i$.

In the exemplary embodiment described herein, the server UMS generates the preferences of the user "mickeymouse" (the username u chosen by John Doe) in the literature-and-book domain taking into account all the indications about the past behavior of mickeymouse in previous sessions in the "Librarian" site or in another site belonging to the literature-and-book domain or to other domains that likely affect literature-and-book preferences.

Based on the indicated interests—e.g., mickeymouse likes science fiction—and preferences—e.g. mickeymouse likes Asimov and does not like Tom Clancy—as provided by the server UMS in a step 108, the application $A_i$ is able to generate a personalized service (e.g., a catalogue of suggested books to buy). By way of example, the application sorts all the available items in its own content description database; this occurs in a manner that is known per se and leads to generating a personal catalogue listing those items that better suit the user model.

In a step 110 the user U (or u) makes use of the personalized services offered by the application $A_i$ navigating in the pages, selecting some items, requesting more information, buying some objects, and so on. Each of these actions are monitored and collected by the application $A_i$ in a step 112.

Once the user session is completed, or at a fixed deadline, in a step 114 the application $A_i$ notifies all the "feedbacks" to the server UMS. The feedbacks that an application generally notifies are: the time spending navigating a page, the selection of some items, the request for additional information, putting of an object into the basket or cart, the explicit rating about an item and so on.

It is assumed for example that
the server UMS is a central user model server offering modeling services owned by different actors who are in competition between each other, and
in a similar domain such as the previous literature-and-book domain, two different service providers affiliate to the server UMS. The former one being a large and wide provider such as "Librarian", while the latter is a small district library such as "Tiny-book" that, starting today, will offer a small online catalogue.

The amount of feedbacks from the large company will inevitably be much larger and perhaps more valuable than the feedbacks provided by the small company. This means that the large provider will probably be reluctant to make available its database of usage data and pieces of business information, as this would provide an additional value also to its competitors.

Therefore, there are two different aspects that a valid candidate UMS should take into account.

A first problem refers to the reliability of usage data: how much an application will trust the feedback provided by other actors and/or competitors.

Another important aspect is that account should be taken of the possibility for an application to specify the set of applications that have the permission to access and use its own usage data or a sub-set of it.

Coming back to the example of "Librarian" and "Tiny-book", due to the high value of its feedbacks, "Librarian" will expectedly wish to forbid access to its usage data for all the competitors except for example for a single book seller which it has a strict and trusted relationship with.

In a preferred embodiment, bi-directional control over the feedbacks can be implemented by the internal architecture of the server UMS shown in FIG. 3. In FIG. 3, an application $A_i$ can access the UMS through an application interface 60, which is configured for exchanging feedbacks and requests for preferences and which comprises an associated protocol which controls the communication between the UMS and the application. The main components of the UMS are:

a first database 10 containing the static information about the registered users and their profiles, for example data as age, gender, addresses, and explicit preferences (i.e., the user data);

a second database 40, comprising a feedback database that collects the feedbacks about users' behavior, each feedback is coupled with its source, that is to say the application that generated it. This database thus comprises the feedback data related to the users;

a third database 30 comprising a registration rule database containing the rules that regulate and control the relationships between the applications and the way for using, in a specific application, the feedbacks provided by other applications; and a user modeling component (UMC) 50 acting as the core of the system that, starting from the profile of the user and the available feedbacks and weighting the feedbacks according to the rules contained in database 30, calculates the preferences of a user in a specific domain.

Preferably, the UMS comprises a fourth database 20 comprising an application provider database wherein each application is described by an appropriate schema (for example: name, affiliation, nationality, application domain, age of presence on the web).

The UMC 50 will be described in more detail with reference to FIG. 6.

Although in the embodiment illustrated in FIG. 3, the first database 10 containing the static information over the users and their profile and the second database 30 containing the dynamic information (i.e. feedbacks relating to users' behavior) are two separate databases, a single database containing static information and dynamic information can be envisaged in the UMS.

When a new content provider subscribes its application to the server UMS, a registration phase begins.

This phase may involve a direct negotiation between different people or could be achieved via appropriate web forms. Often, different applications utilize different criteria to describe/classify the items or a different model to describe the users. In that case, the server UMS may comprise the function of mapping between the different descriptions/classes so that uniformity between the classifications/description is achieved in the system.

The possible trust relationships among applications can be represented with a graph, as shown in the examples schematically illustrated in FIGS. 4a to 4d. Essentially, a graph consists of a set of vertices (here the different applications $A_1, \ldots, A_n$) and a set of edges which connect two vertices in the graph; in the present arrangement, an edge will represent a trust relationship. The designation 'depth' will denote the number of edges between two vertices. In the present embodiment the possibility exists of associating to an edge a numerical value, indicated as 'trust degree', which indicates a percentage of trust, a weight to assign to the feedbacks collected from the vertices.

In accordance with the general graphical representation of FIG. 4a an application $A_1$ wants to register in the UMS in which applications $A_2, \ldots, A_7$ are registered and are linked one another by certain rules. When $A_1$ registers, the other registered applications are linked through certain trust relationships, as those shown in FIG. 4a as an example. $A_2$ has indicated a certain trust relationship with $A_5$, $A_7$ and $A_4$, which is turn has indicated a trust relationship with $A_6$. $A_3$ and $A_6$ have a mutual trust relationship and $A_3$ trusts $A_4$, but $A_4$ does not trust $A_3$, as illustrated from the direction of the arrows. Some examples of trust relationships that $A_1$ can negotiate are listed as follows.

$A_1$ indicates a 100% trust relationship with the vertex/application $A_2$ and depth equal to zero: in determining the preferences of a user u, the UMC will consider the feedbacks from $A_2$ and $A_1$ (FIG. 4b).

$A_1$ indicates a 100% trust relationship with vertex/application $A_2$ and depth equal to 1 under $A_2$ (i.e., applications that are trusted by $A_2$) with trust degree 100% with the exception of $A_7$, which is not trusted: in determining the preferences of a user u, the UMC will consider the feedbacks from $A_1, A_2, A_5$ and $A_4$ but not from $A_7$ (FIG. 4c).

$A_1$ indicates a 100% trust relationship with vertex/application $A_2$ and a depth equal to 1 under $A_2$ with trust degree 60% (i.e., with applications $A_4$ and $A_6$) and a 30% trust relationship with $A_7$: in determining the preferences of a user u, the UMC will consider as globally trusted the feedbacks from $A_2$, it gives a minor weight to the indications from $A_4$ and $A_5$ and still a little smaller weight to the feedbacks from $A_7$ (FIG. 4d).

In order to protect the value of the feedbacks, the addressee of the trust relationship will approve, refuse or refine the request (for example requiring an appropriate remuneration).

In addition to the possibility of expressing a list and the degrees of trust with the other actors, in the registration phase an application can indicate possible restrictions in the use of its own usage data. This means that the generic application $A_i$ could decide to send the complete or a partial set of its usage data to the UMS, but $A_i$ has the power to allow their use for the calculation of preferences to $A_j$ and to forbid their use to $A_k$.

In the exemplary arrangement considered, "Librarian" could for instance deny the access and use of its usage data to "Big-Book" because the competition is too high for sharing usage knowledge, but "Librarian" could allow to provide information to small and quiet business actors such as "Tinybook".

A negotiation process can start each time a new application $A_i$ comes to the system UMS and can be comprised of the following steps:

$A_i$ negotiates the sharing rules with other applications $(A_1, \ldots, A_{i-1}, A_{i+1}, \ldots, A_n)$, indicating the set of A's that can access its usage data, and $A_i$ negotiates the trust relationships with $A_k$'s in which it is interested ($A_i$ negotiates because $A_k$ could accept, refuse or change/refine the request).

Although reference has been made to the situation in which a new application (never previously registered in the system) comes into the system, it is to be understood that rules and relationships may be modified at any time, e.g., after registration of the new application.

This negotiation process is not always a direct communication between people: such a process could become too time-consuming as the number of actors in the system UMS increases.

According to a preferred embodiment, the description of each application managed in the application provider database 20 (FIG. 3), a generic application $A_i$ can define a set of rules and policies by an automatic negotiation process.

For instance:

$A_i$ defines a 100% trust relationship with each application in the literature-and-book domain;

$A_i$ defines a 75% trust relationship with each application that has been present on the web for at least three years;

$A_i$ refuses the utilization of its usage data to young applications (age on the web <3 years) and to national business actors; and $A_i$ defines a 70% trust relationship with "Librarian" and "Big-Book".

Especially in an open environment wherein new applications subscribe to the UMS in whatever moment, policy-based management can be adopted as a way for defining sharing rules and trust relationships. A policy-based management is often used in systems where flexibility is required as users, services and access rights change frequently.

One example of policy language is disclosed in Kagal L. et al.: "*A Policy Language for a Pervasive Computing Environment*", published in IEEE 4*th* International Workshop on Policies for Distributed Systems and Networks (2003), which describes a language based on "deontic" concepts such as rights, prohibitions, obligations and dispensations to perform actions.

After the completion of the registration phase, when a request from an application $A_i$ arrives to the UMS, the calculation in the UMC is carried out as schematically illustrated in FIG. 5.

Specifically, in a step 200 the application $A_i$ requests the user preferences of a pseudonymous user u.

As a result of this, in a step 202, the UMC retrieves the user model for u, while retrieving in a step 204 the feedbacks concerning the same user. Additionally, in a step 206, the UMC retrieves the registration rules relative to application $A_i$.

Based on the outcomes of steps 204 and 206, in a step 208, the UMC makes the appropriate inferences generating predictions about preferences.

Finally, in a step 210, based on the outcomes of steps 202 and 208, the UMC merges the dynamic profile with the static profile of the user u.

Specifically, in the step 208, the UMC retrieves all the available feedbacks concerning the user u and it calculates the appropriate inferences by rejecting the feedbacks from $A_k$ if no trust relationship exists between $A_i$ and $A_k$ or weighing its feedbacks with a certain trust factor.

At the end of the step 208, the component UMC has generated the preferences for a specific user; these preferences values corresponding to the dynamic behavior of the user are integrated and merged in the step 210 (according to well known techniques) with the static information contained in the user profile of the selected user.

Each access to the UMS is generally treated as a request that is discrete, i.e., independent from former and subsequent accesses.

In a real implementation of the system, it may not be practical to save and analyze the log of behaviors of all users in all the registered applications every time a new request is received. This is due to the high level of disk space and computer memory required. A compressed, optimized and scalable way for managing the usage data can be preferred. A possible way of solving this issue is to save only the user information in an aggregated manner and not the entire set of all the collected feedback. This may occur, for example, by storing the results in terms of preferences resulting from inference process performed on the initial set of feedbacks. In addition, it is possible to implement some cache mechanisms that store, for a certain time, the outcome of a certain number of requests of user preferences.

FIG. 6 depicts schematically a detailed architecture of a User Modeling Component (UMC) included in the UMS according to a preferred embodiment of the present invention.

Specifically, $A_1, A_2, A_3, \ldots, A_n$ are n registered applications in the server UMS and UMM($A_1$), UMM($A_2$), $\ldots$, UMM($A_n$), are user modeling modules (UMMs) relative to applications $A_1, A_2, \ldots, A_n$, respectively. The UMMs correspond to software components implementing known user modeling techniques.

The UMC of FIG. 6 is comprised of a software merging component, MC. When the server is notified by a set of usage data performed by the user u in the application $A_i$, these feedbacks are sent to the UMM($A_i$) corresponding to the application $A_i$ and used in a known manner (by way of example, using collaborative filtering algorithms or Bayesian networks). Information about user u collected by each application $A_i$ is indicated in FIG. 6 with ud($A_i$).

When an application $A_x$ requests the preferences, referred to as the prediction value of preference, $P(A_x, u, O_x)$, of the user u in the domain $O_x$ (for example "Librarian" wants to know the preferences of mickeymouse in the literature-and-book domain) the merge component MC requests from the different components UMM($A_j$), with i=1, ..., n the respective prediction values $P(A_j, u, O_j)$ where u designates the user and $O_j$ (with j=1, ..., n) denotes the specific domain. Each UMM($A_j$) is thus able to generate a prediction value corresponding to the user u into a specific domain.

The task of the merge component MC is to calculate the overall user preferences in the domain $O_x$ by taking into account:
- the ontology that relates the domains that may influence to the requested domain $O_x$ (for example the preferences in the literature-and-book domain requested from "Librarian" could be influenced by the music preferences provided by the application "BachNew" according to a mapping table between different ontologies and in a way known per se). An ontology is generally defined as a logical theory which gives an explicit representation of a conceptualization. It allows to represent, in a more or less formal way, concepts of a domain of concern and their relations. The ontology includes relationships between terms in two or more different topics, e.g., similar, broader, narrower;
- the applications that $A_x$ is trusting (for example "Librarian" trusts 100% the preferences inferred by "BachNew" but only 50% the preferences provided by other applications younger than, say, two years in the music domain); and
- the applications that have accepted to share their usage data with $A_x$ (if "Big-Book" has refused the usage data request from "Librarian", the merge component MC cannot use, in its calculations, the preferences provided by "Big-Book").

Bi-directional relationships can be developed between two applications. The term "bi-directional" is intended to highlight the fact that the relationships in question typically involves two actors, both playing an active role (namely accepting, refusing or negotiating the relationship).

Such relationships enable an application to:
- define a policy for the utilization of its own usage data by other applications; and
- define a set of relationships managing the trust of usage data provided by other applications in the calculation and inference of user preferences.

The UMC will thus provide the application $A_x$ with the preference value $P(A_x, u, O_x)$ that has being weighted according to the registration rules relative to the applications.

By monitoring all the notifications of usage data and the requests of user preferences from each application, the server UMS has a clear picture of the activities of each application in the system and the difference between the value of the provided information and the value associated to the requests.

In a further embodiment, a mechanism in which a value or a value function can be explicitly assigned to the exchanged pieces of information may be added to the UMS in order to improve the maintenance of the system balance. An application may be encouraged to actively participate in the system by notifying its feedbacks as an alternative to solve its debit in some ways, e.g. through payment. It could also be possible that the system may not allow an application just to sends requests and never provide usage data. This mechanism can be also referred to as mechanism of "debits" and "credits".

By way of further explanation, reference can be made to a system including:
- "Librarian", selling books and records,
- "Big-book" selling books,
- "GoodDisco", a small record store, and
- "Tiny-book", a small book store.

It will also be assumed that, at the end of the registration phase of the applications listed in the foregoing, the following trust relationships (i.e. trust acknowledged to the other applications) have been established:

| | Trust | | | |
|---|---|---|---|---|
| | Librarian | Big-book | GoodDisco | Tiny-book |
| Librarian | 100% | 95% | 2% | 1% |
| Big-book | 95% | 100% | 3% | 5% |
| GoodDisco | 100% | 100% | 100% | 60% |
| Tiny-book | 97% | 100% | 80% | 100% |

The table in question is to be read as follows: by assuming that the applications accept to provide their user information, GoodDisco will 100% trust indications from Librarian, 100% those from Big-book and only 60% those provided by Tiny-book.

| | Availability to provide indications (sharing rules) | | | |
|---|---|---|---|---|
| | Librarian | Big-book | GoodDisco | Tiny-book |
| Librarian | — | YES | NO | YES |
| Big-book | YES | — | YES | NO |
| GoodDisco | YES | NO | — | YES |
| Tiny-book | NO | YES | YES | — |

The table in question is to be read as follows: Big-book has expressed its availability to provide its user indications to Librarian and GoodDisco but has denied transmission of its data to Tiny-book. This could apply also for a set of data.

A user mickeymouse is now assumed to log into the Big-book website and require a personalized service comprising e.g. browsing a catalogue. According to the prior art of personalization and information retrieval, a personalized catalogue includes a list of items (such as books) that are held to be of interest for the user.

The process for determining the preferences operates as follows.

The system searches (in the Registration Rule Database) the list of those applications that have accepted to provide Big-book their user indications. In the example considered here the list includes {Librarian, Tiny-book} while GoodDisco is not included in this list.

The system then requests from Big-book and all other applications in the previous list the preference values that the respective user modeling modules (UMMs) are in a position to determine. In other words, the system sends out a request for preference values for the books for the user mickeymouse to the Librarian UMM, the Big-book UMM and the Tiny-book UMM.

The system waits for the responses from the three UMMs questioned and collects the values returned. For instance, one may assume that the "ontologies" used in the three applications are identical and the responses provided those listed in the following table.

|  | Big-book | Librarian | Tiny-book |
|---|---|---|---|
| Horror | 10% | 15% | 30% |
| Fantasy | 5% | 10% | 30% |
| Thrillers | 50% | 45% | 10% |
| Romance | 15% | 20% | 20% |
| Adventure | 20% | 10% | 10% |
| Total | 100% | 100% | 100% |

The system determines the final value for the preference function for the books for the user mickeymouse as requested by the application Big-book. This is done by weighing the contributions from the various applications as a function of the trust values expressed by Big-book in their regard (see the first table above).

This result may be achieved as a weighted arithmetic average, such as:

P(horror)=((100×10)+(95×15)+(5×30))/(100+95+5)= 12.88

P(fantasy)=((100×5)+(95×10)+(5×30))/(100+95+5)=8

P(thrillers)=((100×50)+(95×45)+(5×10))/(100+95+5)= 46.63

P(romance)=((100×15)+(95×20)+(5×20))/(100+95+5)= 17.5

P(adventure)=((100×20)+(95×10)+(5×10))/(100+95+5)= 15

Alternatively, the final value of the preference function can be based on more complex algorithms, known per se in the art.

The system sends to the requesting application, namely Big-book, the preference values as determined. After receiving these values, Big-book will use them as deemed best in order to personalize its service based on known techniques, e.g. by presenting in its home page, over a total of 10 books suggested, five thrillers, two romance stories, two adventure books and one horror book.

The sequence outlined above is deliberately simplified with respect to the real implementation and deployment. In fact it is possible to contemplate and manage such situations where different applications may manage different classifications and ontologies. Under these circumstances, the need arises of taking into account mapping between ontologies (by acknowledging that, e.g. "thrillers" for Tiny-book corresponds to "police stories" for Librarian).

In a preferred embodiment, one may consider that in certain conditions a mechanism of debits and credits is set up by properly valuating the information exchanged. The system of debits and credits is managed by the UMS. The UMS collects the values that each application gives to its information and weights to which extent an application shares its information and to which extent the same application requests information.

In the case considered it may well happen that Librarian may state that it is reluctant to provide its user indications to other applications. The possibility exists for any application to label its user indications with respective values. For instance:

Librarian assigns a value 50 to its user information;
Big-book assigns a value 45 to its user information;
GoodDisco assigns a value 10 to its user information; and
Tiny-book assigns a value 5 to its user information.

In that case, in addition to the operations already described, the system will maintain a sort of virtual account for each application: in the case considered, having received information from both Librarian and Tiny-book, Big-book will have a debit against Librarian of 50 units and a debit of 5 units against Tiny-book. Conversely, Librarian will have a credit of 50 units against Big-book.

The related counters are continuously updated at each request for preference values and permit at each instant to evaluate the state of balance of the system, while possibly requesting compensations or compensative actions when remarkable debits or credits have accrued.

Those of skill in the art will promptly appreciate that the various elements described in the foregoing can be hosted on different servers and machines. Specifically the user can manage different terminals and equipment comprising a personal computer, a hand-held computer or a telephone. Moreover, a preferred embodiment provides for the UMS being managed by a mobile phone operator that offers user modeling to several registered applications.

The user modelling server UMS could be a distributed system, hosted by a number of servers.

Specifically, the user modelling component of an application, UMM($A_i$) (see FIG. 6) can be hosted in the system or reside on a different server or machine. This will also facilitate integration with previously existing (legacy) user modelling systems.

The server(s) UMS could be hosted by telecommunication operators, the clients that request personalized applications could be PDA or mobile phones and the network that links the different peers could be an Internet connection, a GPRS and/or UMTS network or the like.

The operator that hosts the system could be itself an application and it could take advantage of the complete and precise user models in order to personalize its services (as a matter of example, a mobile operator could personalize advertisements or applications)

As an example, a possible configuration of a UMS of the kind described herein might include the following elements:

at least one central server hosting the central system; preferably the server in question is a high level server equipped with e.g. a Windows 2000™ server operating system and an application server supporting web services (e.g. Apache Tomcat™) within a Java™ (e.g. 1.4) execution environment as the natural language for distributed programming and having installed thereon a relational database (e.g. Microsoft Access™ or Oracle™ or the like);

one or more peripheral servers having installed thereon the various UMMs (such servers can also be installed with the various application providers); these are typically medium level servers equipped with e.g. a Windows 2000™ Server operating system and an application server supporting web services (e.g. Apache Tomcat™) within a Java (e.g. 1.4) execution environment as the natural language for distributed programming, and a network infrastructure connecting the central server with the various peripheral servers: this may simply be a fixed or mobile telephone network.

The preference values provided by the UMS could be used by the applications in different scenarios such as e.g. the personalization of a list of items to be sold, the personal adaptation of a multimedia content, suggestions for some proactive actions.

In addition to the user modeling functionality, the system could also play the role of authentication server and repository of user information (age, address, credit card details), and/or be used in a big organization where different departments may have different access and trust policies.

The system may also manage the overall balance through a mechanism of debits and credits, and, thanks to the design of the relationships through rules and policies, allow the model to be scrutinized from the user point of view, while also allowing the user to select his/her user model to be kept secret (wholly or partly) and disclosed only to selected, registered applications.

Of course, without prejudice to the underlying principle of the invention, the details and embodiments may vary, also significantly, with respect to what has been described, by way of example only, without departing from the scope of the invention as defined in the claims that follow.

The invention claimed is:

1. A method of providing user modeling in media delivery networks, wherein a set of applications is adapted to exchange usage data collected by each application regarding a user of each application and the user's interaction with each application by means of at least one user modeling server, comprising the steps of:
    associating with said user modeling server a function for regulating exchange of usage data between any of a first application and a second application in said set, wherein said function defines:
        whether said usage data are provided by said first application to said second application,
        a value indicating a degree of trust acknowledged by said second application to the usage data provided by said first application,
        a first preference value from usage data provided by said first application, and
        a second preference value from usage data provided by said second application; and
    calculating, using the user modeling server, a final preference value associated with a user preference for said second application based on said first preference value, said second preference value, and the value indicating said degree of trust acknowledged by said second application to the usage data provided by said first application, the value indicating said degree of trust being applied to said first preference value as a weight.

2. The method of claim 1, wherein said usage data comprise:
    user data related to the registered users and their profiles; and
    feedback data concerning the users' behavior.

3. The method of claim 2, further comprising the step of providing in said user modeling server:
    a first database containing the user data;
    a second database comprising feedback data; and
    a third database containing rules for the exchange of usage data, said rules defining said function.

4. The method of claim 3, further comprising the step of generating a prediction about preferences of a user in a specific domain by taking the user data associated with said user from the first database and the feedback data associated with said user from the second database and weighing said user data and said feedback data according to the rules contained in the third database.

5. The method of claim 3, wherein said user modeling server further comprises a fourth database comprising data describing each application in said set.

6. The method of claim 1, wherein said function is in the form of a bi-directional relationship and wherein any of said first and second applications is configured for accepting, refusing or negotiating said relationship.

7. The method of claim 1, further comprising the steps of:
    valuating said usage data; and
    defining debit and credit values each said application in said set has in respect to usage data exchanged with other applications in said set.

8. The method of claim 1, wherein said applications are associated with respective providers and wherein the method comprises the step of causing at least one of said providers to produce a list of other providers to which usage data are to be provided on the basis of said function.

9. The method of claim 1, wherein said applications are associated with respective providers and wherein the method comprises the step of causing at least one of said providers to produce a list of providers from which information is to be acquired.

10. The method of claim 2, wherein said usage data further comprise environment data related to the users' current location.

11. A system for providing user modeling in media delivery networks, comprising at least one user modeling server whereby a set of applications is adapted to exchange usage data via said at least one user modeling server, wherein said user modeling server has an associated function for regulating exchange of usage data between any of a first application and a second application in said set, and wherein said function defines:
    whether said usage data are provided by said first application to said second application,
    a value indicating a degree of trust acknowledged by said second application to said usage data provided by said first application,
    a first preference value from usage data provided by said first application, and
    a second preference value from usage data provided by said second application; and
    wherein said user modeling server calculates a final preference value associated with a user preference for said second application based on said first application said first preference value, said second preference value, and the value indicating said degree of trust acknowledged by said second application to the usage data provided by said first application, the value indicating said degree of trust being applied as a weight to said first preference value.

12. The system of claim 11, wherein said usage data comprise:
    user data related to the registered users and their profiles; and
    feedback data concerning the users' behavior.

13. The system of claim 12, wherein the user modeling server comprises:
    a first database containing the user data;
    a second database comprising feedback data; and
    a third database containing rules for the exchange of usage data, said rules defining said function.

14. The system of claim 13, further comprising a user modeling component configured to generate a prediction about preferences of a user in a specific domain by taking the user data associated with said user from the first database and the feedback data associated with said user from the second database and weighing said user data and said feedback data according to the rules contained in the third database.

15. The system of claim 13, wherein said user modeling server further comprises a fourth database comprising data describing each application in said set.

16. The system of claim 14, wherein the user modeling component comprises:
- a set of user modeling modules, each user modeling module being associated with an application of said set and comprising the user data and the feedback data, wherein each modeling module is adapted to generate a prediction about preferences of said user; and
- a merge component configured to merge the predictions about preferences from applications of said set and to weigh said predictions according to the rules contained in the third database.

17. The system of claim 11, wherein said function is in the form of a bi-directional relationship and wherein any of said first and second applications is configured for accepting, refusing or negotiating said relationship.

18. The system of claim 11, wherein said applications are associated with respective providers and wherein at least one of said providers stores a list of other providers to which usage data are to be provided on the basis of said function.

19. The system of claim 11, wherein said applications are associated with respective providers and wherein at least one of said providers stores a list of providers from which information is to be acquired.

20. A media delivery network comprising a system according to claim 11.

21. A non-transitory computer readable storage medium encoded with a computer program product loadable into a memory of at least one computer, the computer program product comprising software code portions performing the steps of the method of claim 1.

* * * * *

UNITED STATES PATENT AND TRADEMARK OFFICE
CERTIFICATE OF CORRECTION

PATENT NO. : 7,966,160 B2  Page 1 of 1
APPLICATION NO. : 10/582250
DATED : June 21, 2011
INVENTOR(S) : Fabio Bellifemine et al.

It is certified that error appears in the above-identified patent and that said Letters Patent is hereby corrected as shown below:

On the Title Page, Item (75) Inventors, line 3, "Telecom (IT);" should read --Torino (IT);--.

In claim 11, column 16, line 40, after "based on", delete "said first application".

Signed and Sealed this
Fifteenth Day of January, 2013

David J. Kappos
*Director of the United States Patent and Trademark Office*